United States Patent

Rennick

[15] 3,674,831

[45] July 4, 1972

[54] PROCESS FOR PREPARATION OF METHYLCYCLOPENTANE AND METHYLCYCLOHEXANECARBOXYLIC ACIDS AND ESTERS

[72] Inventor: Leonard E. Rennick, Boothwyn, Pa.

[73] Assignee: Sun Oil Company, Philadelphia, Pa.

[22] Filed: March 25, 1970

[21] Appl. No.: 22,677

[52] U.S. Cl. ................................260/468 CB, 260/514 C
[51] Int. Cl. ................................................C07c 51/00
[58] Field of Search ..................260/514, 468, 533, 497

[56] References Cited

OTHER PUBLICATIONS

Paatz et al. Chem. Ber. 100. 984(1967)

Olah et al. I, JACS. 89, 2227(1967)
Olah et al. II, JACS 90 2726(1968)
Olah, Friedel–Crafts and Related Reactions, I, pp. 189– 191 (1963)

*Primary Examiner*—Lorraine A. Weinberger
*Assistant Examiner*—Robert Gerstl
*Attorney*—George L. Church, Donald R. Johnson, Wilmer E. McCorquodale, Jr. and Paul Lipsitz

[57] ABSTRACT

A process for the preparation of methylcyclopentane and methylcyclohexane carboxylic acids or esters by reacting methylcyclopentane or methylcyclohexane with carbon monoxide at a temperature of from about −10° to +10° C. in the presence of a mixture of fluosulfonic acid and antimony pentafluoride, and drowning the reaction mixture in water or an alkanol.

6 Claims, No Drawings

PROCESS FOR PREPARATION OF METHYLCYCLOPENTANE AND METHYLCYCLOHEXANECARBOXYLIC ACIDS AND ESTERS

Methylcyclohexanecarboxylic acids and esters have been prepared heretofore and most processes involve the reaction of carbon monoxide with a methylcyclohexene (Y. A. Eidus et al., Otd. Obshch. i Tekhn. Khim., 14–18, 1965). When it is attempted to make compounds of this type from the less reactive methylcyclohexane, it has been found that a considerable amount of initiator, such as t-butyl alcohol, is generally required (see U.S. Pat. No. 3,127,438). R. Paatz and G. Weisgerber have reported in Chem. Ber., 100, 984, 1967 that when methylcyclohexane is reacted with carbon monoxide without an initiator, but in the presence of a mixture of HF and $SbF_5$, a mixture of methylcyclohexane carboxylic acids is obtained which contain only about 10 percent by weight of 1-methyl-1-cyclohexanecarboxylic acid.

The present invention provides a process for preparation of methylcyclopentane- and methylcyclohexanecarboxylic acids or their alkyl esters, which reaction products have a larger proportion of the 1-methyl-1-cycloalkanecarboxylic acid isomers. This is accomplished, in accordance with this invention, by reacting a 5- or 6-membered ring alkane, i.e. methylcyclopentane or methylcyclohexane, with carbon monoxide in the presence of a mixture of fluosulfonic acid and antimony pentafluoride, said reaction occurring at about a temperature of from about −10° C. to about +10° C. and thereafter drowning the reaction mixture in water, or, if esters are desired, in an alkanol. As indicated, the process of this invention gives a significant yield of the 1-methyl-1 cycloalkanecarboxylic acid or its esters.

In carrying out the process of the invention the methylcycloalkane and $FSO_3H$—$SbF_5$ mixture are introduced into a pressure vessel and the reaction vessel pressured with carbon monoxide to a partial pressure of from about 3 to about 6 atmospheres, a pressure of about 4 to 4.5 atmospheres being preferred. The molar ratio of $FSO_3H$ to $SbF_5$ used in the process may vary from about 1:1 to about 3:1, with about 2:1 being preferred. The amount of the methylcycloalkane may vary widely, but, preferably, the amount used will be such that the molar ratio of $FSO_3H$—$SbF_5$ to methylcycloalkane will be from about 2:1 to 10:1. Reaction is carried out at a temperature between about −10° and +10° C., with a temperature of about 0° C. being preferred. In order that the process proceed to give relatively high yields of the 1-methyl-1 cycloalkanecarboxylic acid products, the reaction time will be limited to less than about 3 hours and preferably will be about 1 hour. Longer times tend to favor the formation of isomers other than the 1-methyl compound. After the reaction is completed, the reaction products are drowned into water if the acid product is desired or if an ester is the desired product, then the mass is drowned in an alkanol, the lower aliphatic alcohols, such as methanol, ethanol, propanol, isopropanol and the butanols, being preferred. This drowning procedure is best carried out at low temperatures and the desired products may be separated by any of the usual separation techniques, distillation being preferred.

In order to more fully illustrate the process of the invention, the following examples are given.

All reactions were run in a magnetically stirred pressure vessel. To the vessel was added the required amount of fluorosulfonic acid and antimony pentafluoride which was then stirred and cooled at 0° C. (water-ice bath). Nitrogen was bubbled through the acid for one-half hour to remove air and then nitrogen-flushed air-free methylcyclohexane was added to the vessel containing the acid solution. This vessel was then flushed with carbon monoxide and brought to the required pressure. The reaction was then stirred for the required time at 0° C. (water-ice bath). After this time the carbon monoxide pressure was released, and the reaction products were poured into methanol at −78° C. (dry ice-acetone bath). The organic products were then taken up in methylene chloride which was washed with saturated sodium bicarbonate and dried with anhydrous sodium sulfate. Evaporation of the solvent gave the methyl esters, which were analyzed by NMR and IR spectroscopy and by VPC.

The following table illustrates the data obtained from the above procedure.

TABLE

| Example | MCH* used (g.) | $FSO_3H/SbF_5$ (molar) | $FSO_3H$-$SbF_5$/MCH (molar) | Pco (atm.) | T (° C.) | Reaction time (hours) | Percent of products $CH_3$-cyclo-$CO_2CH_3$ (1-methyl) | Percent of products cyclo-$CH_3$,$CO_2CH_3$ |
|---|---|---|---|---|---|---|---|---|
| 1 | 0.7 | 1.9 | 8.0 | 4.3 | 0 | 1.0 | 36.2 | 63.8 |
| 2 | 2.3 | 1.9 | 3.5 | 4.3 | 0 | 1.0 | 22.8 | 66.9 |
| 3 | 1.1 | 1.9 | 7.1 | 4.3 | 0 | 1.0 | 22.0 | 69.0 |
| 4 | 1.2 | 1.9 | 7.0 | 4.3 | 0 | 1.0 | 43.3 | 56.5 |
| 5 | 1.2 | 1.9 | 7.0 | 4.3 | 0 | 4.5 | 7.9 | 88.6 |

*MCH = methylcyclohexane.

It will be observed from the above data that significant amounts of the 1-methyl isomer are formed in the process and that the shorter reaction times favor the formation of this isomer.

Example 6: When the process of Example 1 is carried out with methylcyclopentane, the methyl ester of 1-methyl-1-cyclopentanecarboxylic acid is formed in about the same proportion of total products.

It will be understood that when the reaction products are drowned in other alkanols the corresponding esters are obtained and that if water is used instead of an alkanol, the acids are the final product.

I claim:

1. A process for the preparation of methylcycloalkane carboxylic acids or esters wherein the 1-methyl-1-cycloalkanecarboxylic acid is produced in significant yield, which comprises reacting a 5- or 6-membered ring methylcycloalkane with carbon monoxide for less than 3 hours at a temperature from about −10° C to +10° C at a carbon monoxide pressure at about 2 to 6 atmospheres and in the presence of a mixture consisting essentially of fluosulfonic acid and antimony pentafluoride wherein the $FSO_3H$ to $SbF_5$ molar ratio is from about 1.0 to 3.0, and drowning the reaction mixture in water or a lower alkanol.

2. The process of claim 1 where the methylcycloalkane is methylcyclopentane.

3. The process of claim 1 where the methylcycloalkane is methylcyclohexane.

4. The process of claim 3 wherein the drowning procedure is carried out with methanol.

5. The process of claim 3 wherein the drowning procedure is carried out with water.

6. The process of claim 3 wherein the process is carried out at a temperature of about 0° C., a molar ratio of $FSO_3H:SbF_5$ of about 2.0, a molar ratio of $FSO_3H$—$SbF_5$:methylcyclohexane of about 7.0, a CO pressure of about 4.5 atmospheres, and a reaction time of about 1 hour.

\* \* \* \* \*